United States Patent
Takasan et al.

(10) Patent No.: US 6,637,585 B2
(45) Date of Patent: Oct. 28, 2003

(54) APPARATUS FOR LEVITATING AND TRANSPORTING OBJECT

(75) Inventors: Masaki Takasan, Kariya (JP); Yoshikazu Koike, Yokohama (JP); Sadayuki Ueha, Machida (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 72 days.

(21) Appl. No.: 09/992,114

(22) Filed: Nov. 5, 2001

(65) Prior Publication Data

US 2002/0088693 A1 Jul. 11, 2002

(30) Foreign Application Priority Data

Nov. 7, 2000 (JP) .................................... 2000-339104

(51) Int. Cl.[7] .............................................. B65G 27/00
(52) U.S. Cl. ................... 198/752.1; 271/270; 198/630
(58) Field of Search .............................. 198/752.1, 630, 198/763, 766, 767, 769, 760; 310/323, 321; 181/5; 271/267, 270

(56) References Cited

U.S. PATENT DOCUMENTS

| | | | | |
|---|---|---|---|---|
| 4,757,227 A | * | 7/1988 | Danley et al. | 310/323.19 |
| 4,763,776 A | * | 8/1988 | Okumura et al. | 198/630 |
| 4,841,495 A | * | 6/1989 | Danley et al. | 367/191 |
| 4,962,330 A | * | 10/1990 | Lierke et al. | 310/323.19 |
| 5,036,944 A | * | 8/1991 | Danley et al. | 181/5 |
| 5,810,155 A | * | 9/1998 | Hashimoto et al. | 198/630 |
| 6,455,982 B1 | * | 9/2002 | Hashimoto | 310/328 |

FOREIGN PATENT DOCUMENTS

| | | | | |
|---|---|---|---|---|
| JP | 7-137824 | 5/1995 | ......... | B65G/27/24 |
| JP | 9-169427 | 6/1997 | ......... | B65G/47/22 |
| JP | 9-202425 | 8/1997 | ......... | B65G/27/24 |

* cited by examiner

*Primary Examiner*—Christopher P. Ellis
*Assistant Examiner*—Richard Ridley
(74) *Attorney, Agent, or Firm*—Morgan & Finnegan, LLP

(57) ABSTRACT

An apparatus for levitating and transporting an object includes a pair of elongated vibrators, a pair of oscillators and a pair of flection limiting rods. Each oscillator includes a horn and a transducer and corresponds to one of the vibrators. Each transducer vibrates the corresponding vibrator through the corresponding horn to generate sound waves from the vibrator. The object is levitated by radiation pressure of the sound waves. Each flection limiting rod corresponds to one of the vibrators. Each rod contacts the lower surface of the corresponding vibrator at a position where the displacement due to vibration is relatively small and reduces the flection of the vibrator due to the weight of the vibrator and the weight of the transported object.

19 Claims, 2 Drawing Sheets

APPARATUS FOR LEVITATING AND TRANSPORTING OBJECT

BACKGROUND OF THE INVENTION

The present invention relates to an apparatus for levitating an object by radiation pressure such as sound waves and transporting the levitated object.

Japanese Unexamined Patent Publications No. 7-137824 and No. 9-202425 disclose apparatuses for levitating an object. These apparatuses include elongated plate-like vibrators, which are excited, or vibrated, by transducers. The surface of the levitated object that faces the vibrators is formed flat. The object is levitated by radiation pressure of sound waves, which are generated by vibration of the vibrators. A transporting apparatus that moves a levitated object by blasting air or by producing traveling waves with vibrators has also been proposed.

If vibrators are relatively long, the vibrators are bent by the own weight and the weight of a transported object. Thus, the vertical position of each vibrator varies at the longitudinal center and the ends. This hinders stable transportation of levitated objects. If the interval between each pair of adjacent transducers, which excite the vibrators, is short, the vibrators are not bent. However, this increases the number of the transducers and thus increases the cost. Also, if a transporting apparatus has two or more parallel vibrators, the levitation state of a transported object is unstable since the vibrators are bent at different degrees.

SUMMARY OF THE INVENTION

Accordingly, it is an objective of the present invention to provide a transporting apparatus that uses elongated plate-like vibrators and prevents the vibrators from being bent by the own weight and the weight of the transported object thereby transporting objects in a stable manner.

To achieve the purpose of the present invention, an apparatus for levitating and transporting an object is provided. The apparatus includes an elongated vibrator, an oscillator, and a flection limiting member. The oscillator vibrates the vibrator to generate sound waves from the vibrator. The object is levitated by radiation pressure of the sound waves. The flection limiting member contacts the lower surface of the vibrator for reducing the flection of the vibrator due to the weight of the vibrator and the weight of the transported object.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A transporting apparatus according to a first embodiment of the present invention will now be described with reference to FIGS. 1 to 2(b).

Figure 1:
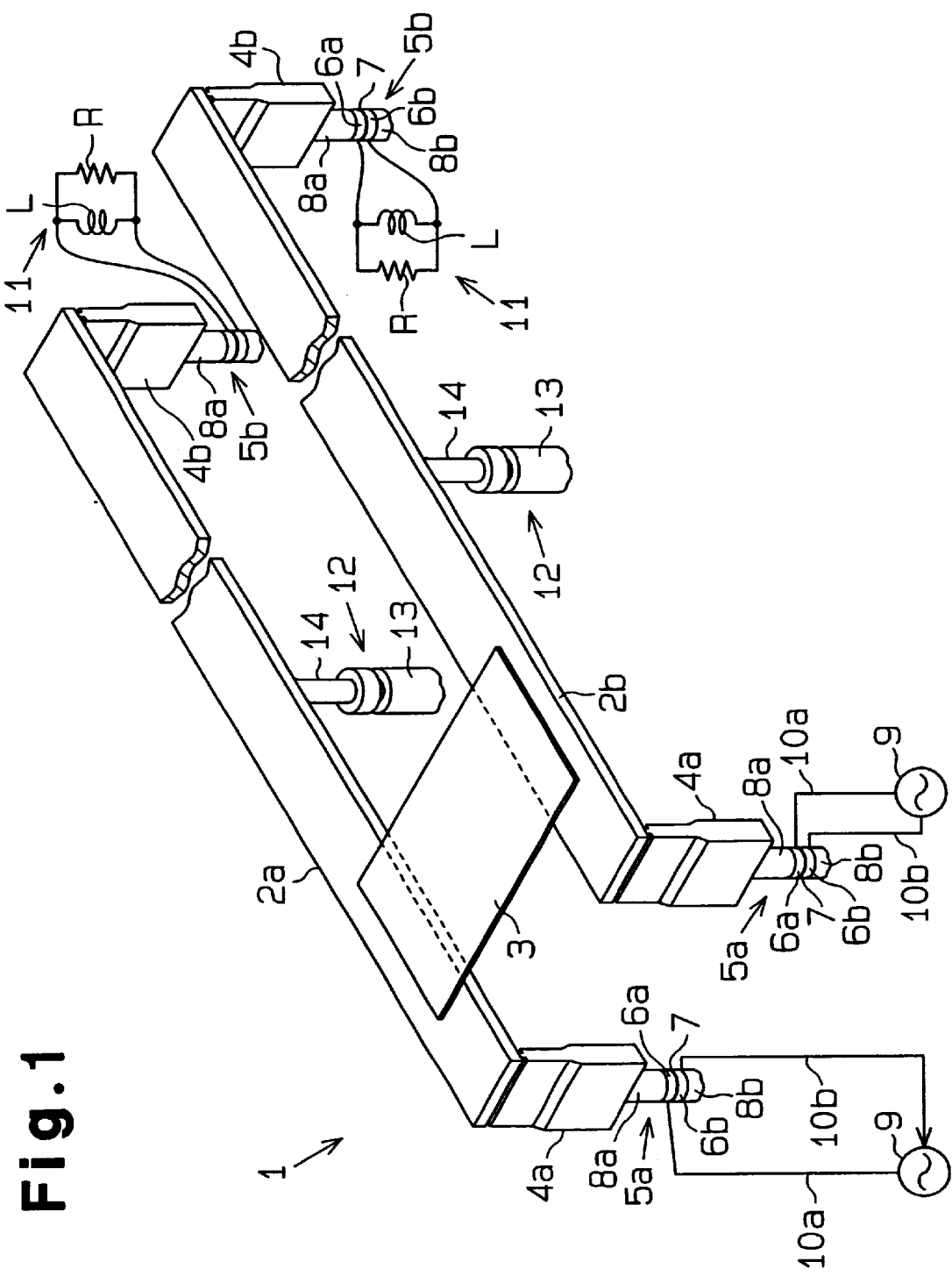
FIG. 1 is a perspective view illustrating a transporting apparatus according to a first embodiment of the present invention.

As shown in FIG. 1, the transporting apparatus 1 includes first and second elongated vibrators 2a, 2b. The vibrators 2a, 2b are parallel and have the same rectangular shape. The vibrators 2a, 2b levitate an object 3. The apparatus 1 includes first horns 4a and second horns 4b. Each first horn 4a is fixed to a first end of one of the vibrators 2a, 2b by bolts (not shown). Each second horn 4b is fixed to a second end of one of the vibrators 2a, 2b. The horns 4a, 4b are shaped as flattened rectangular parallelepipeds and are arranged perpendicular to the longitudinal direction of the vibrators 2a, 2b.

The apparatus 1 includes first and second Langevin transducers 5a, 5b. Each first transducer 5a is coupled to a side of one of the first horns 4a, or to the side opposite from the side fixed to the corresponding vibrator 2a, 2b. Each second transducer 5b is coupled to the lower side of one of the second horns 4b, or to the lower the side opposite from the side fixed to the corresponding vibrator 2a, 2b. The distal face of each horn 4a, 4b is perpendicular to the axial direction of the corresponding the transducer 5a, 5b. The axes of the horns 4a, 4b and the axes of the transducers 5a, 5b extend vertically.

Each transducer 5a, 5b includes upper and lower annular piezoelectric elements 6a, 6b, an annular electrode plate 7, and upper and lower metal blocks 8a, 8b. The electrode plate 7 is located between the piezoelectric elements 6a and 6b. The upper metal block 8a contacts the upper side of the upper piezoelectric element 6a, and the lower metal block 8b contacts the lower side of the lower piezoelectric element 6b. The piezoelectric elements 6a, 6b, the electrode plate 7, and the metal blocks 8a, 8b are fastened to one another by a bolt. The bolt is inserted from the lower metal block 8b and fastened with a threaded hole (not shown) formed in the upper metal block 8a. The two metal blocks 8a, 8b are electrically connected to each other by the bolt.

Each first transducer 5a excites the corresponding first horns 4a and is connected to an oscillator 9. The electrode plate 7 of each first transducer 5a is connected to the oscillator 9 through a first wire 10a. Each oscillator 9 has a ground terminal connected to the associated lower metal block 8b by a second wire 10b. The horns 4a, 4b, the transducers 5a, 5b, the oscillators 9 form an exciting device for exciting the vibrators 2a, 2b.

The second transducers 5b, which are connected to the second horns 4b, are each connected to a load circuit 11. Each load circuit 11 includes a resistor R and a coil L.

Figure 2A:
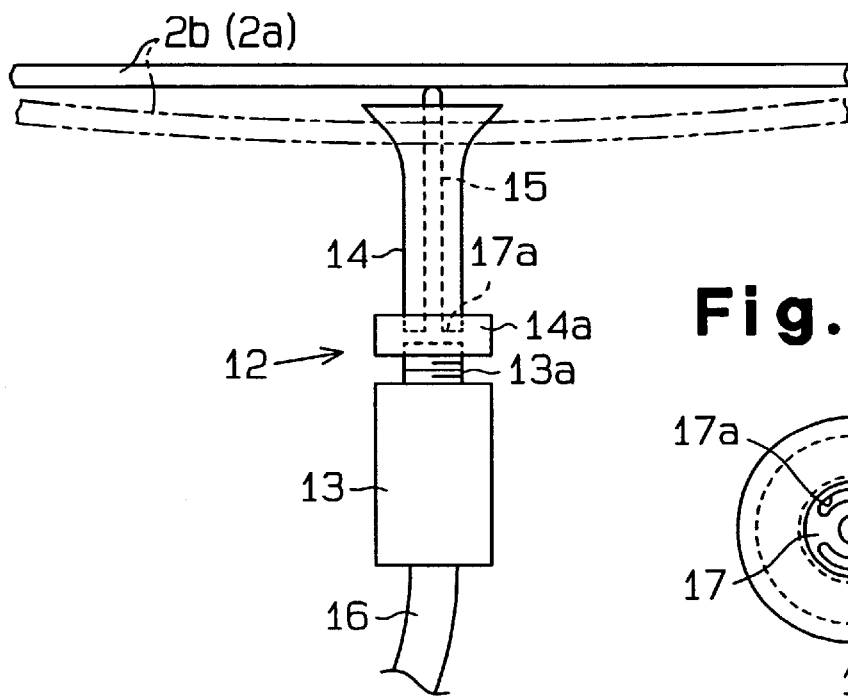
FIG. 2(a) is a partial front view illustrating a bending prevention device of the apparatus shown in FIG. 1.

A flection limiter 12 is located below each of the vibrators 2a, 2b. Each flection limiter 12 faces the substantial center in the longitudinal direction of the corresponding vibrator 2a, 2b. As shown in FIG. 2(a), each flection limiter 12 includes a cylindrical support 13, a suction device, which is a suction nozzle 14 in this embodiment, and a flection limiting member, which is a rod 15 in this embodiment. Each suction nozzle 14 is attached to the upper end of the corresponding support 13. Each rod 15 is located in the corresponding suction nozzle 14. Each support 13 is secured to a predetermined position of a base plate by a bracket (neither is shown). The supports 13 are connected to a vacuum source (not shown) through pipes 16.

As shown in FIG. 2(a), a large diameter portion 14a is formed at the lower end of each suction nozzle 14. A threaded hole is formed in the large diameter portion 14a. A threaded shaft 13a extends from the upper end of each support 13 and is engaged with the threaded hole of the large diameter portion 14a. The height of the suction nozzle 14 is altered by adjusting the threaded amount of the threaded shaft 13a into the threaded hole. The suction nozzle 14 is shaped like a funnel and its diameter increases toward the upper end.

Each flection limiting rod 15 extends along the center of the corresponding suction nozzle 14. The distal end of the rod 15 protrudes from the suction nozzle 14. As shown in FIG. 2(b), a support wall 17 is formed in the large diameter portion 14a of each suction nozzle 14. The support wall 17 is perpendicular to the axis of the suction nozzle 14. A pair of arcuate openings 17a are formed in the support wall 17. The arcuate openings 17a are used for sending drawn dust to the pipe 16. The interior of the nozzle 14 is connected to the pipe 16 through the arcuate openings 17a and a passage (not shown) formed in the support 13. The rod 15 extends from the center of the support wall 17. The distal end of the rod 15 is formed semispherical and is coated with low-friction material such as polytetrafluoroethylene.

The rod 15 of each flection limiter 12 contacts the corresponding vibrator 2a, 2b at a position where displacement due to vibration is relatively small. When determining the positions of the supports 13, the position of each flection limiting rod 15 is determined by causing the rod 15 contact the corresponding vibrator 2a, 2b and seeking a position at which the rod 15 receives the smallest force in the state that the vibrators 2a, 2b are excited. Specifically, the vibrators 2a, 2b are excited and each rod 15 is arranged to contact the corresponding vibrator 2a, 2b. Then, a position at which the rod 15 receives the smallest force is determined.

The operation of the apparatus 1 will now be described.

When the first transducers 5a are excited at a predetermined resonance frequency (e.g., approximately 20 kHz), the horns 4a, 4b are vertically vibrated. This produces bending vibration in the vibrators 2a and 2b. The bending vibration of each vibrator 2a, 2b generates sound waves. The levitating force produced by the sound waves levitates the object 3 from the top surfaces of the vibrators 2a, 2b. The levitated distance of the object 3 is several tens of micrometers to several hundreds of micrometers.

The vibration of each vibrator 2a, 2b are transmitted to the second transducers 5b, which are connected to the load circuits 11. Then, the energy of the vibrations is converted into electrical energy by the piezoelectric elements 6a, 6b. The electrical energy is converted into Joule heat by the resistors R of the load circuits 11 and diffused. Consequently, waves of the vibrations generated in the vibrators 2a, 2b are turned into traveling waves, which travel in one direction (the direction from the first horns 4a to the second horns 4b in this embodiment). As a result, the object 3 is transported in a levitated state from the end of the first end to the second end of the vibrators 2a, 2b. The transportation of the object 3 is stopped by stopping the current from the oscillators 9 to the first transducers 5a.

Since the vibrators 2a, 2b are elongated, each vibrator 2a, 2b would be greatly flexed as shown in FIG. 2(a) by its own weight and the weight of the object 3 if there are no flection limiter 12. In this state, when the object 3 is moved from the first end of the vibrators 2a, 2b to the center by traveling waves, the front part of the object 3 is lowered. When the object 3 is moved from the center to the second end, the front part of the object 3 is raised. Thus, the object 3 cannot be transported in a stable manner. However, the apparatus 1 has the flection limiters 12, which are located at the substantial centers of the vibrators 2a, 2b. So, the flection limiters 12 adjust the flection of the vibrators 2a, 2b, which reduces the flection of the vibrators 2a, 2b due to the own weight and the weight of the object 3. As a result, the object 3 is transported in a level state from the first end to the second end of the vibrators. In other words, the object 3 is stably transported.

The first embodiment has the following advantages.

(1) The flection limiting rods 15 are each located at the center of each vibrator 2a, 2b. Each rod 15 contacts the corresponding vibrator 2a, 2b to prevent the vibrator 2a, 2b from being excessively flexed by its own weight and the weight of the object 3. Thus, the object 3 is levitated and transported in a stable manner.

(2) Each flection limiting rod 15 contacts the corresponding vibrator 2a, 2b at a position where the displacement due to vibration is relatively small. Thus, compared to a case in which the rod 15 contacts the vibrator 2a, 2b at a position where the displacement is great, the rod 15 receives smaller force of collision, which prevents the rod 15 from being prematurely worn.

(3) The suction nozzle 14 is located in the vicinity of the contact point between each flection limiting rod 15 and the corresponding vibrator 2a, 2b. Therefore, when repetitive collision between the vibrator 2a, 2b and the rod 15 creates dust, the dust is drawn by the nozzle 14, which maintains the transportation environment clean.

(4) The rods 15 are more easily worn than the vibrators 2a, 2b. Thus, the vibrators 2a, 2b are scarcely worn, which improves the durability of the vibrators 2a, 2b.

(5) The diameter of each suction nozzle 14 increases toward the distal end. Therefore, the nozzles 14 effectively draw dust created by repetitive collision between the rods 15 and the vibrator 2a, 2b.

(6) The first and second vibrators 2a, 2b are parallel. Therefore, the wide object 3 is stably levitated and transported.

(7) The protruding amount of each rod 15 is adjustable. Therefore, when assembling the apparatus 1, each rod 15 is adjusted to reliably contact the corresponding vibrator 2a, 2b. When each rod 15 is worn due to an extended use, the position of the distal end is easily adjusted.

A transporting apparatus 101 according to a second embodiment of the present invention will now be described. The differences from the apparatus 1 of FIGS. 1 to 2(b) will mainly be discussed below, and like or the same reference numerals are given to those components that are like or the same as the corresponding components of the apparatus of FIGS. 1 to 2(b).

Figure 3:
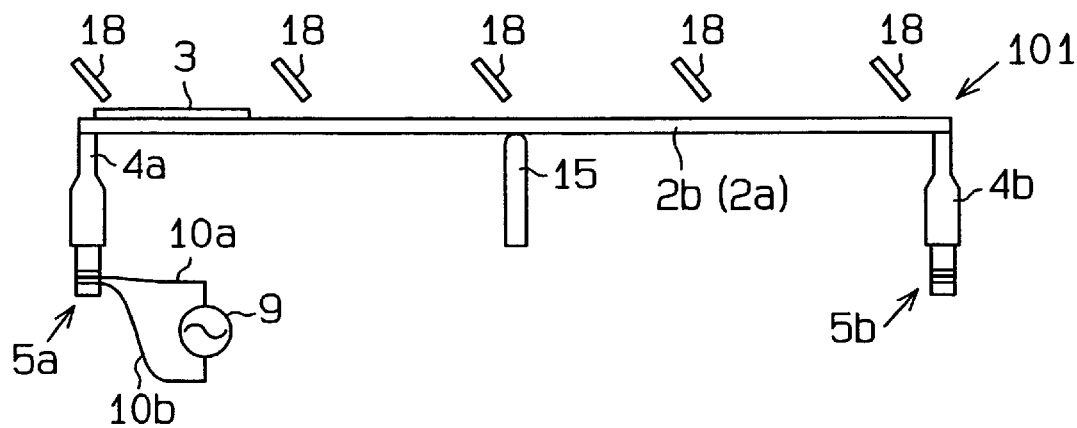
FIG. 3 is front view illustrating a transporting apparatus according to a second embodiment of the present invention.

In the embodiment of FIG. 3, the vibrators 2a, 2b generates standing waves. As shown in FIG. 3, the second transducers 5b at the second end of the vibrators 2a, 2b are not connected to the oscillators 9 or the load circuits 11. Propelling devices, which are propelling nozzles 18 in this embodiment, are arranged at a predetermined intervals along the vibrators 2a, 2b. The object 3 is levitated by the standing waves. In this state, the nozzles 18 blast air to the object 3, which transports the object 3.

Figure 2B:
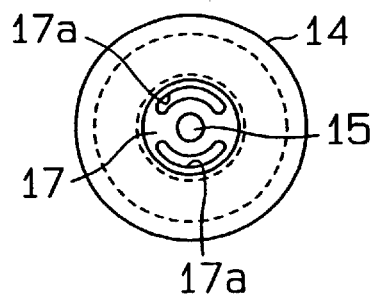
FIG. 2(b) is a plan view illustrating a suction nozzle of the apparatus shown in FIG. 1.

Unlike the apparatus of FIGS. 1 to 2(b), the apparatus 101 of FIG. 3 does not have the suction nozzle 14. Since each rod 15 contacts the corresponding vibrator 2a, 2b, the apparatus 101 prevents the vibrators 2a, 2b from being excessively flexed as effectively as the apparatus 1.

It should be apparent to those skilled in the art that the present invention may be embodied in many other specific forms without departing from the spirit or scope of the invention. Particularly, it should be understood that the invention may be embodied in the following forms.

In the embodiment of FIGS. 1 to 2(b), the threaded hole formed in the large diameter portion 14a of each suction nozzle 14 is threaded to the threaded shaft 13a of the corresponding support 13. However, each nozzle 14 and the corresponding support 13 may be connected by a different structure. For example, the threaded shaft 13a of each support 13 may be replaced by a threaded recess that is formed in the upper portion of the support 13, and threaded shaft may protrude downward from the large diameter portion 14a of the corresponding nozzle 14. In this case, the height of each rod 15 is adjusted by the threaded amount of the threaded recess and the threaded shaft.

The thread may be omitted from the large diameter portion of each suction nozzle 14, and a threaded hole that is perpendicular to the axis of the nozzle 14 may be formed in the side wall of the nozzle 14. In this case, the thread of the shaft 13a of the support 13 is also omitted. The suction nozzle 14 is fitted to the support 13. Then, the relative position of the nozzle 14 and the support 13 is determined and a screw is threaded to the threaded hole in the side wall of the nozzle 14 to secure the nozzle 14 to the support 13.

The suction nozzles 14 may be omitted, and nozzles that are separated from the rods 15 may be arranged in the vicinity of the contact points of the rods 15 and the vibrators 2a, 2b.

Each rod 15 may be pressed against the corresponding vibrator 2a, 2b by, for example, a spring. In this case, the distal end of each rod 15 always contacts the corresponding vibrator 2a, 2b. Thus, compared to a case in which the distal ends of the rods 15 repeatedly collide with the vibrators 2a, 2b, the rods 15 are not easily worn.

In the apparatus 1 of FIG. 1, the transducers 5a, 5b at the ends of the vibrators 2a, 2b may be selectively connected to the oscillator 9 and the load circuits 11. In this case, the moving direction of the object 3 is selected by switching the connection between the transducers 5a, 5b and the oscillator 9 and the load circuits 11.

The number of the vibrators 2a, 2b is not limited two. Other vibrators may be located between the vibrators 2a, 2b. The vibrators between the vibrators 2a, 2b need not produce traveling wave but may produce only standing waves. In this case, the vibrators are not significantly flexed by the weight of the object 3. Thus, the object 3 is reliably levitated and smoothly transported.

Instead of transporting the object by the two vibrators 2a, 2b, only one vibrator may be used for transporting the object 3.

If the object 3 need be transported for a long distance, several apparatuses 1 (101) may be arranged in series.

The first transducers 5a may be connected to a common oscillator 9.

The horns 4a, 4b need not be flattened rectangular parallelepipeds, but may be cylindrical. Alternatively, the horns 4a, 4b may have a conical shape with its diameter increased at lower locations.

The object 3 does not have to be square and may have other polygonal shapes or round shapes.

Instead of using bolts to fasten the vibrators 2a, 2b to the associated horns 4a, 4b, the vibrators 2a, 2b may be adhered, brazed, or welded to the associated horns 4a, 4b.

The transducers 5a, 5b do not have to be Langevin transducers and may be any type of transducer.

Therefore, the present examples and embodiments are to be considered as illustrative and not restrictive and the invention is not to be limited to the details given herein, but may be modified within the scope and equivalence of the appended claims.

What is claimed is:

1. An apparatus for levitating and transporting an object, comprising
    an elongated vibrator;
    an oscillator, wherein the oscillator vibrates the vibrator to generate sound waves from the vibrator, wherein the object is levitated by radiation pressure of the sound waves; and
    a flection limiting member, wherein the flection limiting member contacts the lower surface of the vibrator at a position where the displacement due to vibration is relatively small for reducing the flection of the vibrator due to the weight of the vibrator and the weight of the transported object.

2. The apparatus according to claim 1, further comprising a suction device, wherein the suction device is located in the vicinity of the contact point between the flection limiting member and the vibrator.

3. The apparatus according to claim 2, wherein the suction device includes a suction nozzle, wherein the flection limiting member is a rod, and wherein the rod is located in the suction nozzle such that the distal end of the rod protrudes from the suction nozzle.

4. The apparatus according to claim 2, wherein the vibrator is one of a plurality of vibrators, the flection limiting member is one of a plurality of flection limiting members, the oscillator is one of a plurality of oscillators, wherein each flection limiting member and each oscillator correspond to one of the vibrators.

5. The apparatus according to claim 4, wherein each vibrator produces traveling waves.

6. The apparatus according to claim 4, wherein each vibrator produces standing waves, and wherein the apparatus further includes a propelling device, which propels a levitated object.

7. The apparatus according to claim 6, wherein the propelling device is a propelling nozzle for blasting air onto a levitated object.

8. The apparatus according to claim 7, wherein the propelling nozzle is one of a plurality of propelling nozzles.

9. An apparatus for levitating and transporting an object, comprising;
    an elongated vibrator;
    an oscillator, which includes a horn and a transducer, wherein the transducer vibrates the vibrator through the horn to generate sound waves from the vibrator, wherein the object is levitated by radiation pressure of the sound waves, and
    a flection limiting rod, wherein the flection limiting rod contacts the lower surface of the vibrator at a position where the displacement due to vibration is relatively small and reduces the flection of the vibrator due to the weight of the vibrator and the weight of the transported object.

10. The apparatus according to claim 9, further comprising a suction device, wherein the suction device is located in the vicinity of the contact point between the flection limiting rod and the vibrator.

11. The apparatus according to claim 10, wherein the suction device includes a suction nozzle, and wherein the rod is located in the suction nuzzle such that the distal end of the rod protrudes from the suction nozzle.

12. The apparatus according to claim 9, wherein the vibrator is one of a plurality of vibrators, the flection limiting rod is one of a plurality of flection limiting rods, the oscillator is one of a plurality of oscillators, wherein each flection limiting rod and each oscillator correspond to one of the vibrators.

13. The apparatus according to claim 12, wherein each vibrator produces traveling waves.

14. The apparatus according to claim 12, wherein each vibrator produces standing waves, and wherein the apparatus further includes a propelling device, which propels a levitated object.

15. The apparatus according to claim 14, wherein the propelling device is a propelling nozzle for blasting air onto a levitated object.

16. The apparatus according to claim 15, wherein the propelling nozzle is one of a plurality of propelling nozzles.

17. An apparatus for levitating and transporting an object, comprising:

a pair of elongated vibrators;

a pair of oscillators, each of which includes a horn and a transducer, wherein each oscillator corresponds to one of the vibrators, wherein the transducer of each oscillator vibrates the corresponding vibrator through the corresponding horn to generate sound waves from the vibrator, wherein the object is levitated by radiation pressure of the sound waves; and a pair of flection limiting rods, wherein each flection limiting rod corresponds to one of the vibrators, wherein each rod contacts the lower surface of the corresponding vibrator at a position where the displacement due to vibration is relatively small and reduces the flection of the vibrator due to the weight of the vibrator and the weight of the transported object.

18. The apparatus according to claim 17, comprising a pair of suction devices, wherein each suction device corresponds to one of the vibrators, and wherein each suction device is located in the vicinity of the contact point between the corresponding flection limiting rod and the corresponding vibrator.

19. The apparatus according to claim 18, wherein each suction device includes a suction nozzle, wherein the corresponding rod is located in the suction nozzle such that the distal end of the rod protrudes from the suction nozzle.

* * * * *